Patented Feb. 29, 1944

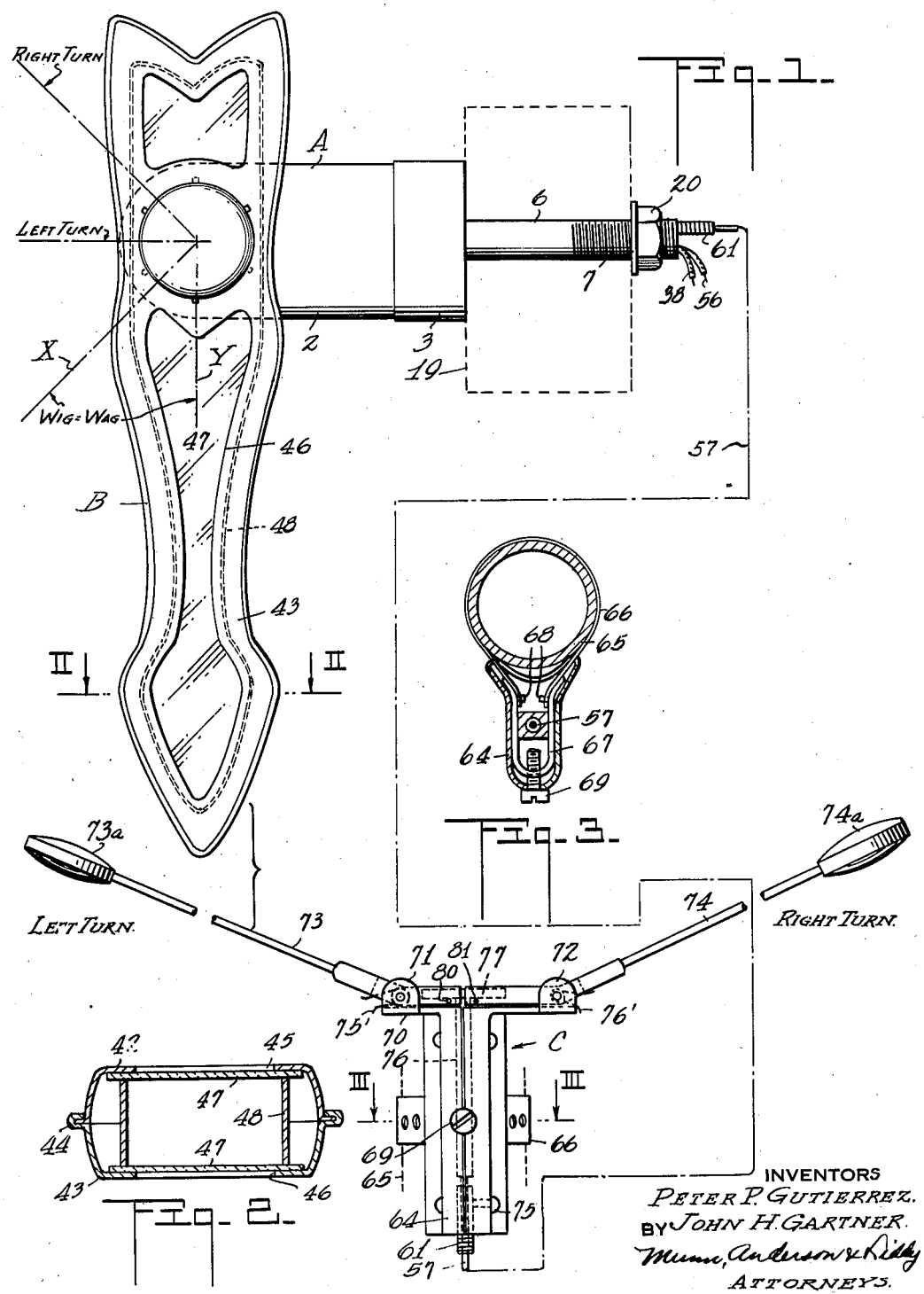

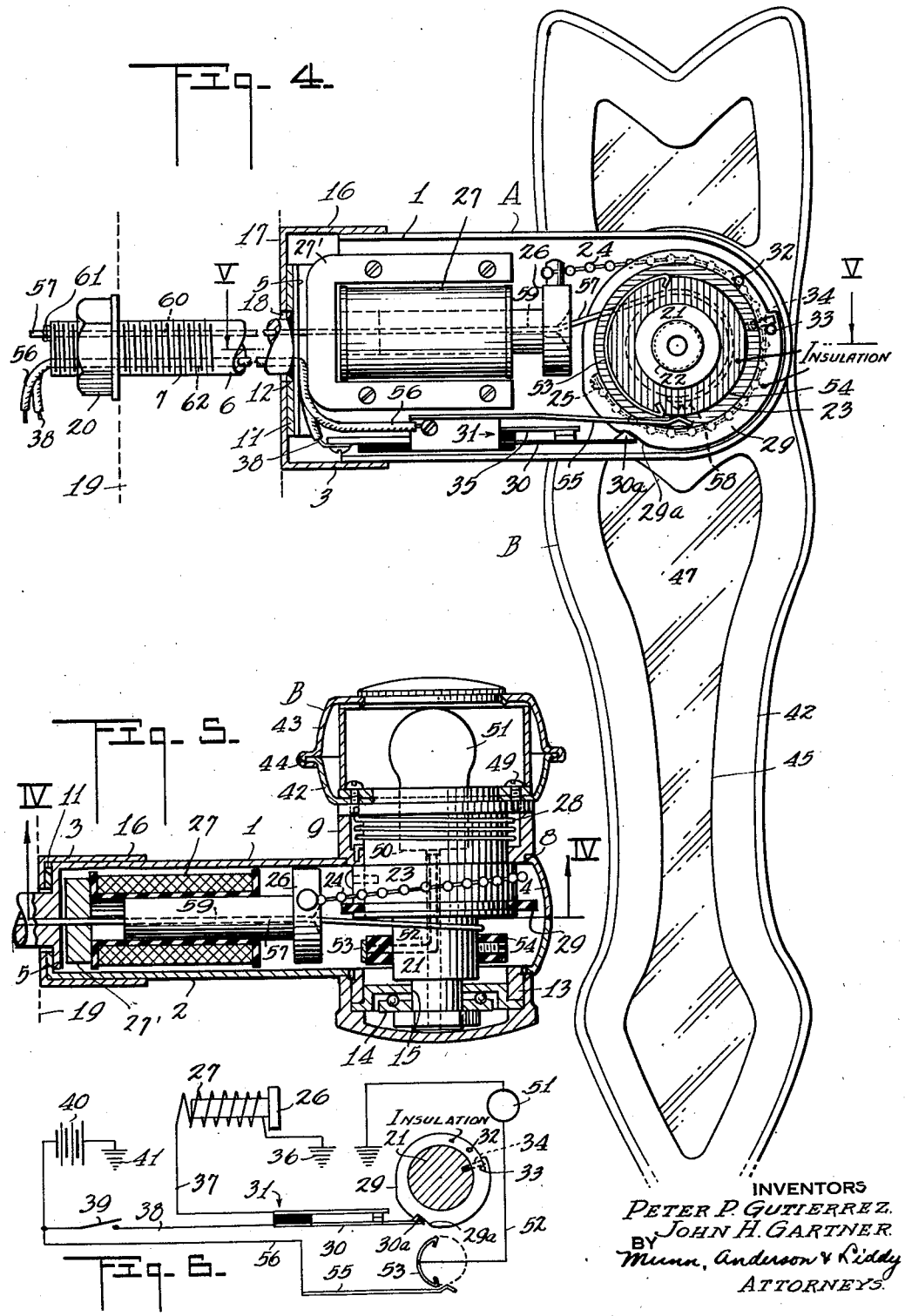

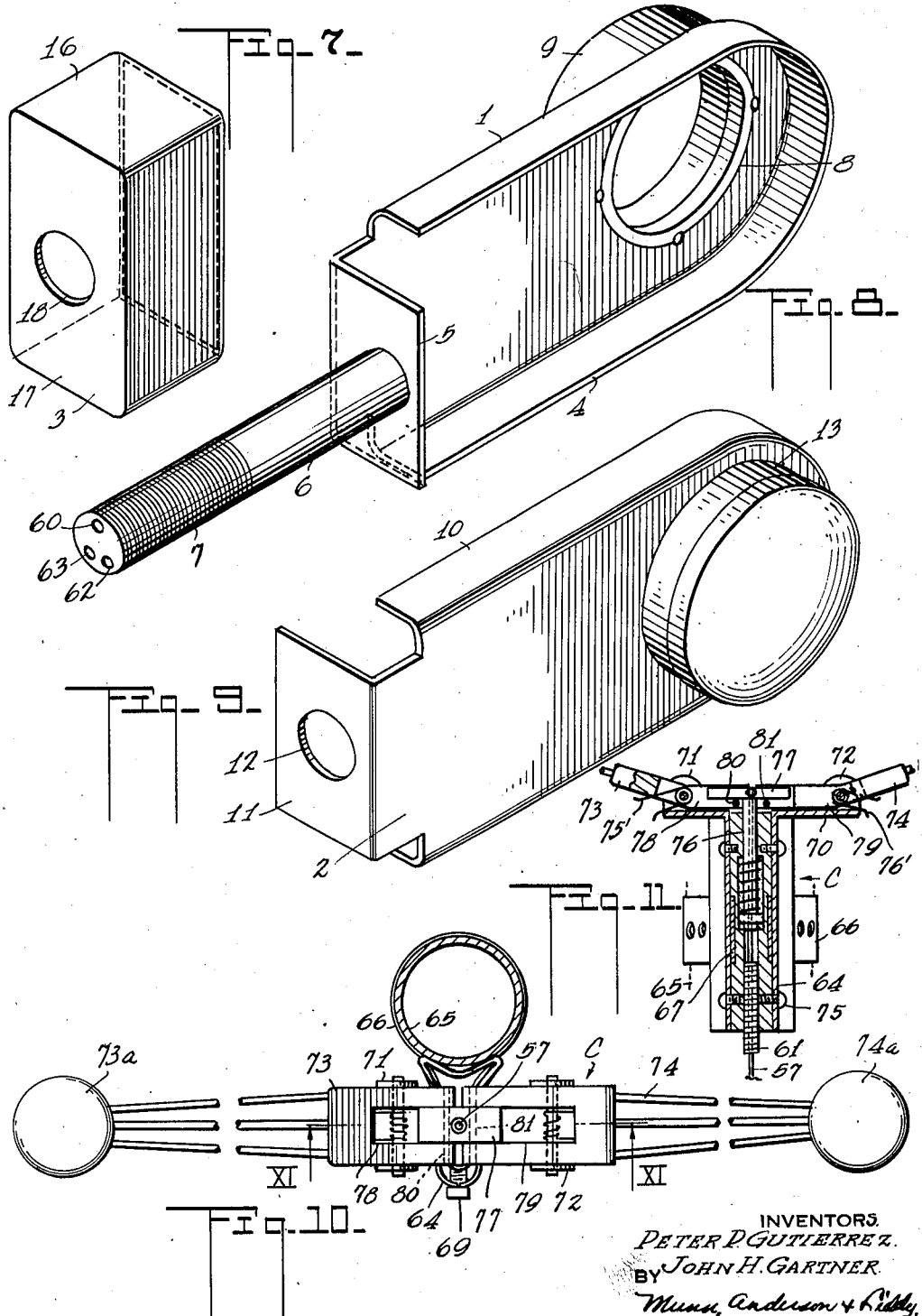

2,342,935

UNITED STATES PATENT OFFICE 2,342,935

DIRECTION SIGNAL

Peter P. Gutierrez, Watsonville, and John H. Gartner, Kentfield, Calif.; said Gartner assignor to said Gutierrez Application October 30, 1940, Serial No. 363,454

3 Claims. (Cl. 177—327)

The present invention relates to improvements in a direction signal, and it consists of the combinations, constructions and arrangements hereinafter described and claimed.

An object of our invention is to provide a direction signal in which the signal control is mounted on the steering column and has two levers, one being extended to the left and the other to the right. The driver, by merely depressing the left-hand lever will cause the signal to indicate a left-hand turn, and by depressing the right-hand lever will operate the signal to indicate a right-hand turn. During the giving of the signal, therefore, one hand is free for use in steering the vehicle.

A further object of our invention is to provide a device of the type described in which novel electrical means will cause the signal to wig-wag when the brake is applied. The electrical control will not interfere with the mechanical mechanism for causing the device to act as a direction indicator.

Still a further object is to provide a signal housing for the working parts which is tamper and theft proof when once secured to a vehicle. The device is compact in construction and has been designed to warn drivers in approaching cars whether the driver on whose automobile the signal is disposed contemplates stopping, making a right-hand or left-hand turn.

Other objects and advantages will appear as the specification proceeds, and the novel features of our invention will be particularly set forth in the appended claims.

For a better understanding of our invention, reference should be had to the accompanying drawings, forming part of this application, in which:

Figure 1 is a view of the signal and its control shown as being schematically connected together;

Figure 2 is a transverse section taken through the signal arm along the line II—II of Figure 1;

Figure 3 is a transverse section through the signal control casing taken along the line III—III of Figure 1;

Figure 4 is a longitudinal section of the signal housing as viewed along the line IV—IV of Figure 5;

Figure 5 is a horizontal sectional view through the signal housing and taken along the line V—V of Figure 4;

Figure 6 is a wiring diagram showing the various circuits employed in our device;

Figures 7, 8 and 9 are isometric views of the parts that make up the signal housing;

Figure 10 is a top plan view of the signal control; and

Figure 11 is a vertical section taken through the signal control casing along the line XI—XI of Figure 10.

While we have shown only the preferred form of our invention, it should be understood that various modifications or changes may be made within the scope of the appended claims without departing from the spirit of our invention.

In carrying our invention into practice, we provide a signal housing indicated generally at A. This housing will be described first, together with its internal mechanism and wiring diagram. Then our signal arm B and the signal control C will follow in order, and finally we will set forth briefly the operation of the entire device.

Signal housing

The signal housing A is clearly illustrated in Figures 4, 5, 7, 8 and 9, and it is composed of two halves 1 and 2 and a closure 3. The half or part 1 has a flanged edge 4 that extends along two sides and around a curved end and is spaced from the other end. A separate end flange 5 (see Figure 8) is spaced from the ends of the flange 4 and carries a pipe 6, which is threaded at its outer end 7. This pipe, or perforated rod, has bores for the purpose hereinafter described. The part 1 also has an opening 8 in which a cylindrical member 9 is fitted (see Figure 5). The function of the member 9 will be described later.

The other half or part 2 has a flange 10 similar to and cooperating with the flange 4. An end flange 11 is spaced from the ends of the flange 10 and has an opening 12 for receiving the pipe 6. The flange 11 abuts the flange 5 when the parts are assembled. In Figure 5, we show the part 2 with a hollow boss 13 in which a thrust bearing 14 is mounted, the latter having a shaft-receiving opening 15. It will be noted from Figure 9 that the end flange 11 is spaced from the ends of the flange 10.

The two parts or halves of the housing A are clamped tightly together by the closure 3, which has four side walls 16 and a bottom 17 with a central opening 18. The opening 18 receives the pipe 6 and the side walls 16 snugly telescope over the parts 1 and 2 with their flanges 4 and 10 tightly held in abutting relation. The pipe 6 is passed through an opening in the wall 19 (see Figure 4) of a vehicle body and a nut 20 is screwed onto the pipe and clamps the closure 3 against the wall and secures all of the parts together. The housing is now tamper- and theft-proof, since it is necessary that the nut be unscrewed from the pipe before the housing can be opened, and the nut is disposed on the inside of the vehicle.

Within the housing we rotatably mount a shaft 21 that is of the shape illustrated in Figure 5. The shaft rotates in the cylindrical member 9 and the reduced shaft end 22 rotates in the opening 15 of the thrust bearing 14. A collar 23 mounted on the shaft has a flexible chain 24 secured thereto at 25 (see Figure 4) and to an armature 26 of a solenoid 27. The connection is such that a movement of the armature to the left in Figure 4 will swing the signal arm B in a counterclockwise direction in that view and in a clockwise direction in Figure 1. A tortional spring 28 (see Figure 5), connected to the shaft and to the member 9, tends to rotate the shaft in the opposite direction, thus urging the signal arm to its normal depending position as disclosed in Figure 1.

A lost motion circuit breaking switch mechanism operates in conjunction with the solenoid 27. A fibre washer 29 (see Figures 4, 5 and 6) is freely mounted on the shaft 21 so that the shaft can rotate without rotating the washer. We provide yielding means for holding the washer from rotating and this means consists of one of the spring switch arms 30 of the circuit breaking switch indicated generally at 31.

The switch arm 30 has a projection 30a normally received in a recess 29a formed in the washer 29. The latter carries two spaced-apart pins 32 and 33 and the shaft 21 has a pin 34 projecting therefrom that rides between the pins 32 and 33. When the shaft 21 is swung in a counterclockwise direction in Figure 4 by the armature 26 and chain 24, the projection 30a holds the washer from rotating until the shaft pin 34 contacts with the washer pin 32, whereupon further rotation of the shaft will carry the washer therewith and cause the projection 30a to move out of the recess 29a. This will open the circuit-breaking switch 31 by separating the switch arm 30 from the associate switch arm 35. This will break the circuit to the solenoid 27 as disclosed in the wiring diagram, and the deenergizing of the solenoid will permit the spring 28 to return the shaft 21 to starting position.

Again the switch arm 30 will frictionally engage with the washer 29 and initially hold it against movement until the pin 34 contacts with the pin 33. At this point the washer will turn with the shaft and when the signal arm B is in vertical position, as depicted in Figure 4, the washer recess 29a will receive the projection 30a and permit the switch 31 to close. This again connects the solenoid with the source of current and the operation may be repeated.

We will now briefly describe the wiring diagram that causes the signal arm B to wig-wag in the manner just described. In Figure 6, the solenoid 27 has one wire grounded at 36 and the other wire 37 leads from the solenoid to the switch arm 35 of the circuit-breaking switch 31. Another wire 38 leads from the switch arm 30 to a vehicle brake-controlled switch 39 and thence to a source of current 40 and back to a ground 41. When the driver applies the brake (not shown), the switch 39 is closed and this will energize the solenoid 27 and move the signal arm B to the left in Figure 1 and to the right in Figure 4. The lost motion mechanism already described will open the switch 31 when the arm B reaches the position X. The solenoid is now deenergized and the spring 28 returns the arm to the normal position Y. This closes the switch 31 and the result is an intermittent closing of the circuit to the solenoid with the result that the arm B will wig-wag between the positions X and Y.

It should be particularly noted that after the signal arm B has been raised to the position X and the switch opened, the fibre washer 29 will hold the switch arms 30 and 35 apart until the signal arm B has returned to substantially normal position. Thus, during the return of the signal arm from the position X to the position Y, the circuit-breaking switch 31 remains open and the solenoid will not oppose the return of the signal arm. Figures 4 and 5 show a U-shaped metal member 27' extending around the solenoid 27 so as to increase the pull on the armature 26 when the solenoid is energized.

Signal arm

The signal arm B is illustrated in Figures 1, 2 and 4 and is in the shape of an arrow. The arm is hollow and is formed from two identical halves or parts 42 and 43 with their abutting sides crimped together as at 44. Each part 42 and 43 has windows 45 and 46 covered by transparent material 47, which may be colored red to attract attention, if desired, or in any other suitable color. Figure 2 indicates the manner in which the opposed layers of transparent material are spaced from each other by a spacing member 48 that follows the general outline of the arrow. The inner surface of the member 48 is made in the nature of a reflector and increases the lighting effect of the signal arm. The arm B is secured to the shaft 21, as at 49 in Figure 5. This will cause the arm B to be swung when the shaft 21 is rocked.

The shaft 21 has a lamp-receiving socket 50 in one end and a lamp 51 is disposed in the socket. When the lamp is illuminated, the entire signal arm B is lighted and will attract attention. The shaft 21 acts as an electric ground for the lamp. A wire 52 leads from the bottom of the socket to an arcuate conductor strip 53 which is mounted on a fibre ring 54 fixed to the shaft, see Figure 5. A switch arm 55 rides against the ring 54 when the signal arm is in normal position, and when the shaft 21 is rocked the arm will contact with the strip 53. The wiring circuit in Figure 6 sets forth the electrical connections between the light 51 and the source of current. The arm 55 is connected to the source of current by a wire 56. When the shaft 21 is rocked, the strip 53 wipes the arm 55 and establishes a contact that connects the lamp 51 with the current source. The lamp 51 will not be illuminated when the signal arm is in the position Y.

The signal arm B also may be manually swung to indicate "left turn" and "right turn" positions. A flexible cable 57 has an end secured to the shaft 21 at 58 (see Figure 4). The cable is passed through the bore 59 of the hollow armature 26 and thence through a bore 60 in the pipe 6. The end of a cable housing 61 is secured to the pipe 6 and the cable 57 enters the housing before it emerges from the pipe. In this way, the cable is protected. It might be well to state here that the wire 38 leading from the switch 31 and the wire 56 leading from the switch 55 pass through two bores 62 and 63 in the pipe 6, see Figures 4 and 8.

Signal control

The cable 57 and the housing 61 form a flexible connection that leads from the pipe 6 to the signal control C illustrated in Figures 1, 3, 10 and 11. The signal control comprises a casing 64 and this casing is clamped to the steering column 65 of the vehicle by a perforated band 66 that encircles the column. A keeper 67, see Figure 3, is disposed in the casing and has pins 68 that enter the desired openings in the band. The keeper is now moved in the casing by a screw 69 for tightening the band about the steering column and for clamping the casing to the column. In this way, the casing may be secured to a steering column, regardless of its size.

The top of the casing is formed into a platform 70 and this platform carries pairs of lugs 71 and 72 in which levers are pivoted. A "left turn" lever 73 is pivoted in the lugs 71 and this lever extends to the left of the steering column. A "right turn" lever 74 is pivoted in the lugs 72 and extends to the right of the steering column. Both levers are positioned under the steering wheel (not shown). The flexible connection has its cable housing 61 secured to the casing 64 by means of screws 75 (see Figure 11). The cable 57 itself extends beyond the housing 61 and is secured to a spring-pressed plunger 76 that is slidably mounted in the casing. The plunger has a head 77 that is received in recesses 78 and 79 formed in the adjacent ends of the levers 73 and 74, respectively. Transverse wires 80 and 81 are carried by the levers 73 and 74, respectively, and extend across the recesses 78 and 79. These wires extend under the head 77 and when either lever 73 or 74 is depressed, its wire 80 or 81 will raise the head and pull on the cable 57.

The pivot point of the lever 73 is closer to the head 77 than the pivot point of the lever 74 and, therefore, a depressing of the knob 73a of the lever 73 will raise the plunger 76 a less distance than when the knob 74a of the lever 74 is depressed. We have so designed the pivot points for causing the lever 74 to move the plunger and cable one-half again the distance through which they are moved when the lever 73 is actuated.

In Figure 1, we indicate the line "left turn" and this is the position into which the signal arm B will be swung when the lever 73 is depressed. We have also indicated the line "right turn" in the same view, and this is the position into which the signal arm will be swung when the lever 74 is depressed. During either of these movements, the cable 57 will slide through the armature 26 without affecting its movement in the least. The platform 70 acts as a stop for the downward movement of the levers. The levers 73 and 74 are yieldingly held in their raised or normal positions by springs 75' and 76' (see Figure 11).

Operation

The housing A is secured to the vehicle body wall 19 and the casing 64 is fastened to the steering column 65 in the manner previously described. When the driver wishes to make a left turn, the lever 73 is depressed, this lever also extending from the left side of the steering column. This will pull the cable and rotate the shaft 21 for swinging the signal arm B into the "left turn" position indicated in Figure 1.

When a right turn is desired, the driver depresses the right hand lever 74 and this will move the cable through a longer distance and swing the signal arm B into the "right turn" position. The driver can perform either operation with ease and still keep one hand on the steering wheel. The levers have been designed to be operated by the natural movements of the driver's arms. When making a left turn, the driver instinctively thinks of his left hand, and when making a right turn the natural thing is for the driver to use his right hand. The left hand is already on the left side of the steering column, so it is easy to use this hand in depressing the lever 73. In a like manner, the right-hand is on the right side of the steering column and it is perfectly natural for the driver to use this hand in depressing the lever 74, which already extends to the right of the steering column. The outer ends of both levers swing through the same arc when depressed. It is the position of the pivot points of the levers that determines the different distances through which the cable is pulled.

The wig-wagging of the signal to indicate "stop" is automatic and electrically controlled when applying the brake of the vehicle, closing the switch 39 and causing the solenoid to be intermittently energized and deenergized in the manner described. It should be noted that the mechanical movement of the signal arm B into left and right turn positions does not interfere with the electrical wig-wag mechanism for the flexible chain 24 merely slackens. On the other hand, the wig-wagging of the signal means will merely slacken the cable 57 without causing harm to the mechanical operating features.

When applying our device to an automobile having the gear-shifting lever mounted on the steering column, it may be found necessary to arrange the signal control C so that the plunger 76 is disposed more or less horizontally so that the levers 73 and 74 will swing clear of the gear-shifting lever.

We claim:

1. In a direction signal, a housing, a shaft rotatably carried thereby, a signal arm mounted on the shaft, electrical means operatively connected to the shaft for causing the signal arm to wig-wag for indicating "stop" when a brake pedal actuated switch connects the means to a source of current, and manually operable mechanical means for selectively swinging the arm through greater arcs than the electrical means to indicate either a "left turn" or "right turn" positions.

2. In a direction signal, a housing, a shaft rotatably carried thereby, a signal arm mounted on the shaft, a solenoid having a hollow armature movable by the solenoid when the latter is connected to a source of current, means operatively connecting the armature to the shaft for rocking the latter when the solenoid is energized, a flexible cable extending through the hollow armature and being connected to the shaft for rotating it through a greater angle than that accomplished by the armature, and manually operable means for selectively moving the cable for swinging the arm into the desired angular positions.

3. In a direction signal, a housing, a shaft rotatably carried thereby, a signal arm mounted on the shaft, a solenoid having a hollow armature movable by the solenoid when the latter is connected to a source of current, a cable operatively connecting the armature to the shaft for rocking the latter when the solenoid is energized, electromechanical means for successively energizing the solenoid for causing the signal arm to wig-wag for indicating "stop" when a brake pedal actuated switch connects the means to a source of current, a second cable extending through the hollow armature and being connected to the shaft for rotating it through a greater angle than the accomplished by the armature, and manually operated "left turn" and "right turn" indicating levers operatively connected to the second cable for selectively moving it for swinging the arm into the desired angular positions for indicating "left turn" and "right turn."

PETER P. GUTIERREZ.
JOHN H. GARTNER.